Figure 1:
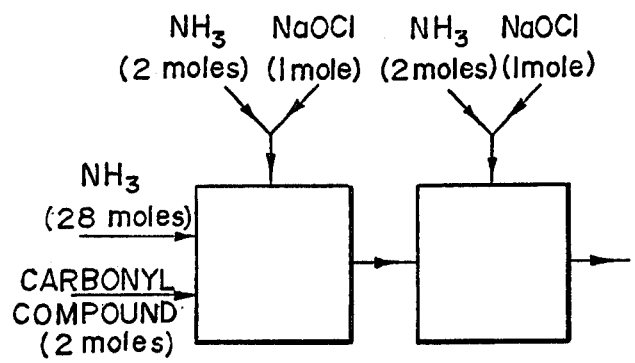

United States Patent [19]

Needham et al.

[11] 4,101,581

[45] Jul. 18, 1978

[54] PREPARATION OF AZINES BY A CASCADE SYSTEM

[75] Inventors: Brian John Needham, Newton; Michael Arthur Smith, Harton, both of England

[73] Assignee: Fisons Limited, London, England

[21] Appl. No.: 115,663

[22] Filed: Feb. 16, 1971

Related U.S. Application Data

[63] Continuation-in-part of Ser. No. 87,616, Nov. 6, 1970, abandoned, which is a continuation of Ser. No. 576,060, Aug. 30, 1966, abandoned.

[30] Foreign Application Priority Data

Sep. 11, 1965 [GB] United Kingdom .............. 38884/65
Apr. 23, 1966 [GB] United Kingdom .............. 17873/66

[51] Int. Cl.$^2$ ............................................. C07C 119/00
[52] U.S. Cl. ................................................. 260/566 B
[58] Field of Search ..................................... 260/566 B

[56] References Cited

U.S. PATENT DOCUMENTS

2,984,032 7/1959 Rudner ............................ 260/566 B

OTHER PUBLICATIONS

Hougen et al., "Chemical Process Principles, Part III," pp. 1028–1032 (1947).
Perry's "Chemical Engineers' Handbook", Fourth Ed., pp. 21-20 to 21-23 (1963).
Laver et al., Chemical Engineering Techniques, pp. 288–290, and 310–312 (1952).
Treybal, Mass Transfer Operations, pp. 97–99 (1955).

*Primary Examiner*—Gerald A. Schwartz
*Attorney, Agent, or Firm*—Richard P. Crowley

[57] ABSTRACT

Azines are prepared by reacting aqueous ammonia and a carbonyl compound with chloramine in a series of two or more reactors arranged in a cascade system.

27 Claims, 5 Drawing Figures

PREPARATION OF AZINES BY A CASCADE SYSTEM

REFERENCE TO PRIOR APPLICATIONS

This application is a continuation-in-part application of U.S. patent application Ser. No. 87,616, filed Nov. 6, 1970 (now abandoned), which application is a streamlined continuation of U.S. application Ser. No. 576,060, filed Aug. 30, 1966 (now abandoned).

The present invention is concerned with improved processes for the manufacture of azines and isohydrazones which may be converted to hydrazine, hydrazine hydrate or hydrazine salts.

The manufacture of azines and isohydrazones is based on the reaction of chloramine and ammonia with carbonyl compounds in the presence or absence of a strong base. In the presence of a strong base, the reaction followed leads to the azine, in the absence of a strong base, the reaction followed leads to the isohydrazone. In the presence of insufficient strong base, a mixture of azine and isohydrazone is formed. The chloramine used in the reaction may be formed "in situ" in the reaction, or may be formed in a separate stage. The chloramine is generally formed by the reaction of chlorine or a hypochlorite (usually bleach) and ammonia, in the liquid or gaseous phase.

It has now been found that improved results and special advantages are obtained by carrying out the reaction of chloramine with the aqueous ammonia and a carbonyl compound in two or more stages.

Accordingly, the present invention provides a process for the production of azines and/or isohydrazones which comprises reacting, in the presence of a strong base, chloramine with aqueous ammonia and a carbonyl compound of the formula:

wherein $R^1$ is hydrogen or alkyl, preferably containing 1 to 4 carbon atoms such as methyl, ethyl, propyl or butyl; $R^2$ is alkyl, preferably containing 1 to 4 carbon atoms such as for example methyl, ethyl, propyl or butyl; aryl such as phenyl; or wherein $R^1$ and $R^2$ together with the carbon atom of the carbonyl group form a cycloaliphatic ring; in a series of at least two reactors arranged in a concurrent cascade system, the total carbonyl compound being added to the first reactor only, wherein less than all of the chloramine is added to the first reactor.

Preferably the pH of the reaction liquor is maintained within the range 12.8 to 13.5, and at least two moles of the carbonyl compound are generally used per mole of azine formed.

The use of the cascade system according to the present invention offers the advantages of requiring only simple equipment, and giving high mole ratios of reactants in individual stages whilst requiring very low overall mole ratios, as well as being very simple to operate. Furthermore, the reduction in the mole ratio of ammonia to other reactants necessary affords a considerable saving in raw material and recovery costs.

Desirably the cascade system comprises 3 or 4 reactors arranged in a cascade system.

The chloramine may be formed in situ, for example by the reaction of chlorine and aqueous ammonia or may be formed as a separate step for example by the reaction of gaseous chlorine and gaseous ammonia or aqueous hypochlorite and aqueous ammonia.

Investigation of the chloramine formation shows that it is virtually instantaneous, even at the lower temperatures. Decomposition sets in, however, fairly quickly, especially when formed in aqueous solution (e.g. with 8% bleach and 20% ammonia, chloramine decomposition becomes noticeable after about 8 seconds) and it is, therefore, important in the modification of the invention where chloramine is formed in a separate step to feed the chloramine to the aqueous ammonia and carbonyl compound as quickly as possible. The residence time will obviously depend on flow rates etc., but must be adjusted to allow complete formation of chloramine but not to allow decomposition to occur.

Where the chloramine is formed in situ, this is most suitably by the reaction of gaseous chlorine with aqueous ammonia.

Where the chloramine is formed in a separate step, this is suitably by the reaction of aqueous ammonia and bleach (i.e. aqueous sodium hypochlorite) or by the reaction of gaseous chlorine and gaseous ammonia. In the latter case, the reaction suitably takes place at the point of entry to the reactor, for example the gaseous ammonia and gaseous chlorine being introduced through concentric twin nozzles.

The reaction according to the present invention is preferably carried out by adding chloramine or the reactants to form chloramine to each vessel in the reactor series, while the major part, and preferably the total amount, of the carbonyl compound reactant is added to the first reactor. The bulk of the aqueous ammonia required is preferably all added to the first reactor and only the aqueous ammonia required for chloramine formation (if any) is added to the subsequent reactors.

As the base it is preferred to use an alkali metal hydroxide such as potassium hydroxide or sodium hydroxide. Other bases such as calcium hydroxide, quaternary bases such as anion exchange resins, tetramethylammonium hydroxide and benzyltrimethylammonium hydroxide and the like may be used. In view of cost it will generally be most suitable to use sodium hydroxide.

Examples of suitable carbonyl compounds are acetaldehyde, propionaldehyde, methyl isobutyl ketone, diethyl ketone, benzaldehyde and cyclohexanone. Preferably the carbonyl compound is acetone or methyl ethyl ketone.

An agent such as gelatin or ethylenediamine tetra acetic acid may be used to sequester any ions which may interfere with the reaction, although this is not essential.

The process of the present invention may be operated at atmospheric pressure or elevated pressures. If super-atmospheric pressures are used the pressure is preferably not more than 20 atmospheres above atmospheric pressure.

The temperature at which each step of the present process is operated is not critical and may be for example any temperature between 0° C or below and the boiling point at the pressure employed of the carbonyl compound. Where operating the process in the absence of sufficient base to yield azine without isohydrazone, it is usually most convenient to operate both stages of the process at a temperature in the range 25° to 45° C. Where operating the process in the presence of sufficient base to yield azine mainly or exclusively, the slower reaction is the formation of azine from hydrazone, and the rate of this reaction increases with increase of temperature, so that the higher temperatures, for example 40°–55° C are preferred.

Figure 2:
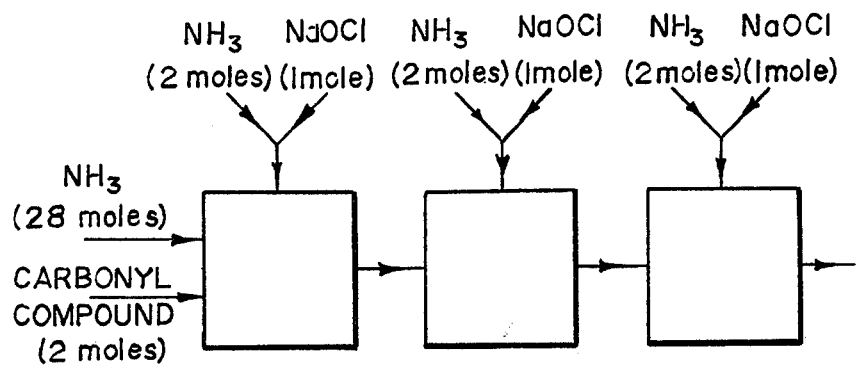
Figure 3:
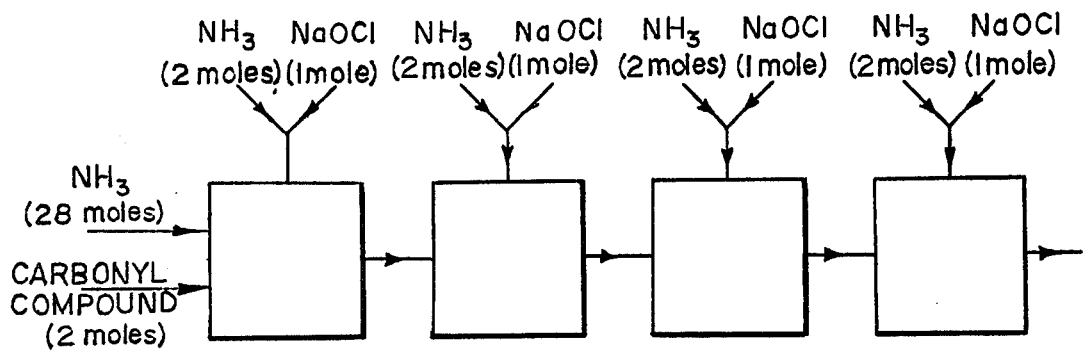

The practical effect of the present invention is shown in the accompanying FIGS. 1, 2 and 3, which illustrate, solely by way of example, processes where chloramine is formed in a separate step from bleach and ammonia.

These Figures show the reaction where chloramine is formed from 2 moles of ammonia and 1 mole of bleach; if desired, however, the chloramine can be prepared using different ratios of ammonia and bleach. In the processes shown in FIGS. 1, 2 and 3, there is a total ammonia bleach mole ratio of 30:1 in each reactor. In the 2 stage process (FIG. 1) the overall mole ratio of ammonia:bleach is 16:1. (28 + 2 + 2) : (1 + 1) ; in the 3 stage process (FIG. 2) the overall mole ratio of ammonia:bleach is 11.3:1 (28 + 2 + 2 + 2) : (1 + 1 + 1) ; and in the 4 stage process (FIG. 3) the overall mole ratio of ammonia:bleach is 9:1 (28 + 2 + 2 + 2 + 2) : (1 + 1 + 1 + 1).

To achieve lower overall ammonia:bleach ratios some of the reaction product from the final stage can be recycled to the first stage. This recycling enables the mole ratio in the individual stages to be maintained at a high level whilst the overall ratio is kept at a low level. The ratio at which the liquor is recycled will determine the mole ratio achieved in each stage. It is generally desirable to have as high a concentration of ammonia as possible in the final stage of the reaction and consequently it is desirable that the concentration of the ammonia introduced in the aqueous ammonia/carbonyl compound mixture should also be as high as possible, e.g. 35% for ambient temperature and pressure, although this may be increased with increased pressure.

The azine substantially free from isohydrazone which is formed by the present invention may be readily converted into hydrazine hydrate or hydrazine salts by hydrolysis. Thus the aqueous azines can be readily converted to hydrazine salts by treatment with an acid such as hydrochloric acid or sulphuric acid or may be converted directly to hydrazine hydrate for example by distillation, suitably under pressure. The invention consequently provides a very effective and economic method of making hydrazine since the other product of the hydrolysis is the carbonyl compound which can be recycled to the process.

The following examples are given to illustrate the present invention.

EXAMPLE 1

Figure 4:
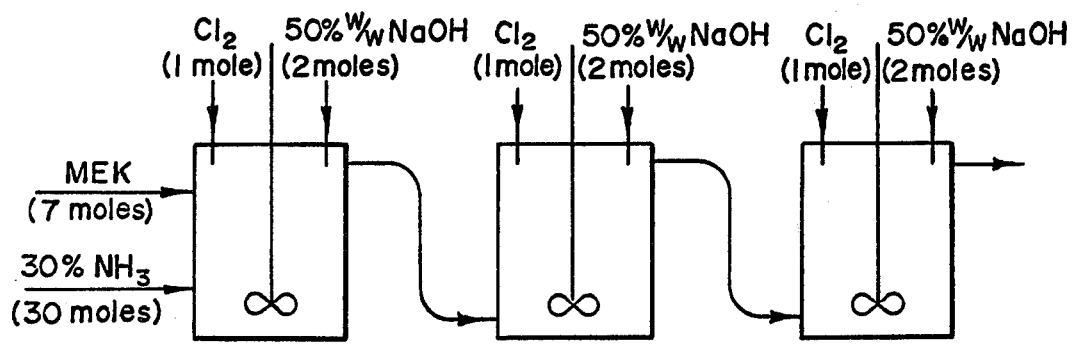

The process of this example was carried out using an arrangement as shown in FIG. 4.

Using the apparatus illustrated, 30 mole per hour of aqueous ammonia (30% w/w) and 7 mol per hour of methyl ethyl ketone, were fed to the first reactor, which overflowed to the second reactor, which in turn overflowed to the third reactor. When all three reactors were full, 1 mol per hour of chlorine and 50% w/w aqueous sodium hydroxide were fed to each reactor such that at 35° C the pH in each reactor was maintained between 12.8 and 13.5. The stirred reactors contained baffles to give good mixing and efficient dispersion of the chlorine gas. Using a residence time of 15 minutes in each reactor and a temperature of 35° C, the yield of methyl ethyl ketone azine was 90%.

The overall mol ratio of $Cl_2$:$NH_3$:methyl ethyl ketone: NaOH was 1:10:2.33:2.

EXAMPLE 2

Figure 5:
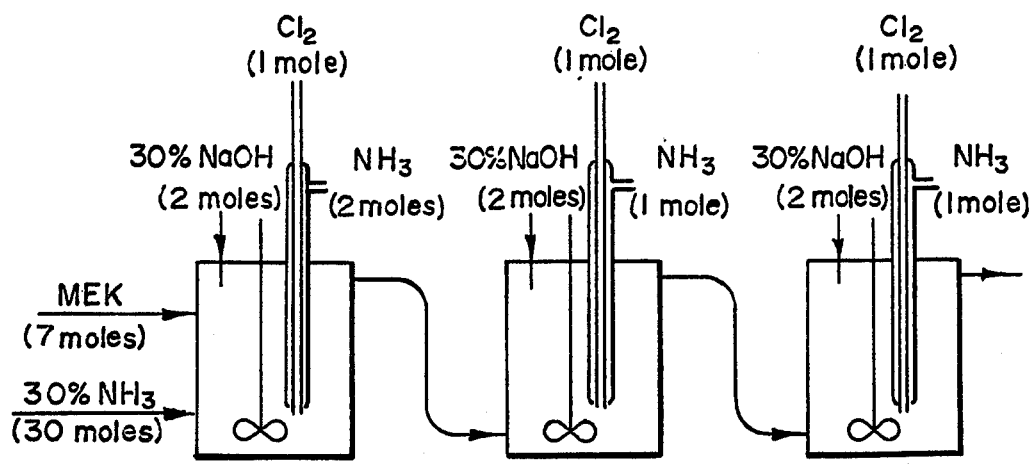

The process of this example was carried out using an arrangement as shown in FIG. 5.

Using the apparatus illustrated, 30 mol per hour of aqueous ammonia (30% w/w) and 7 mol per hour of methyl ethyl ketone were fed to the first reactor which overflowed to the second reactor, which in turn overflowed into the third reactor. When all three reactors were full, 30% w/s aqueous sodium hydroxide was added to each reactor at a rate of 2 mol per hour and at the same time ammonia and chlorine were added through the concentric twin nozzles, in each reactor, gaseous ammonia at a rate of 2 mol per hour through the outer nozzle and gaseous chlorine at a rate of 1 mol per hour through the inner nozzle. Using a reaction temperature of 35° C and residence time of 15 minutes in each reactor, the yield of methyl ethyl ketone azine was 92%.

EXAMPLE 3

Chloramine was generated in three separate Y-tube reactors, feeding into three stirred tank reactors in sequence as shown in FIG. 2. The chloramine was formed by the reaction of 2 moles of 8% aqueous solution of ammonia with one mole of 6% bleach solution and fed continuously to each stirred tank reactor at a rate of one mole per hour. At the same time 6 moles per hour of methyl ethyl ketone and 38 moles per hour of 35% aqueous ammonia were fed to the first reactor. Thus the total mole ratio of ammonia to bleach in each stirred tank reactor was 40:1 and the overall ratio of ammonia to bleach was about 15:1. The azine was obtained in 95% yield.

EXAMPLE 4

The same procedure as in Example 3 was followed except that the 35% aqueous ammonia was fed through the stirred tank reactors at a rate of 24 mole per hour giving a total ammonia bleach ratio in each reactor of 26:1 and an overall ammonia bleach ratio of 10:1. The azine was obtained in 94% yield.

EXAMPLE 5

The same procedure as in Example 3 was followed except that the methyl ethyl ketone was replaced by acetone. The acetone azine was obtained in 93% yield.

EXAMPLE 6

The procedure of Example b 1 was followed by cyclohexanone was used in place of the methyl ethyl ketone. The yield of cyclohexanone azine, as measured by hydrolysis with sulphuric acid and titration of the released hydrazine, was 94%.

EXAMPLE 7

By way of comparison, methyl ethyl ketazine was prepared by a single stage process as follows:

Aqueous sodium hypochlorite of 8% concentration was continually mixed at room temperature in a Y-tube of 1 mm internal diameter with a 25% aqueous ammonia solution in a mole ratio of 1:10, the contact time being about 1.5 seconds. The resulting chloramine solution was added at a rate of 0.3 moles per hour to a vigorously stirred reactor vessel fitted with an overflow. Methyl ethyl ketone was continuously added to the flash at 0.6 moles per hour through a line adjacent to the Y-tube. The temperature in the reactor vessel was maintained at 50°-55° C. The yield of methyl ethyl ketazine by this single stage process was 72%, as compared to 90% by the process of Example 1.

EXAMPLE 8

The same procedure as in Example 1 was followed except that no sodium hydroxide was added. The product consisted of a mixture of azine and isohydrazone of methyl ethyl ketone. Hydrolysis of a sample with dilute sulphuric acid followed by titration of the hydrazine sulphate with potassium iodate showed that a 92% yield of hydrazine had been obtained. The addition of a sample to a solution of potassium iodide in 2N sulphuric acid followed by titration of the liberated iodine with sodium thiosulphate showed that 73% of the hydrazine was present as the isohydrazone.

EXAMPLE 9

The same procedure as in Example 2 was followed except that no sodium hydroxide was added. A 92% yield was obtained, and 75% of the hydrazine was present as isohydrazone.

We claim:

1. In a process for the production of azines which comprises reacting, in the presence of a strong base, chloramine with aqueous ammonia and a carbonyl compound of the formula:

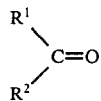

wherein $R^1$ is selected from the group consisting of hydrogen or 1 - 4 carbon alkyl and $R^2$ is selected from the group consisting of 1 - 4 carbon alkyl and phenyl, and $R^1$ and $R^2$ taken together is cyclohexanone to provide an azine-containing reaction product; the improvement comprising carrying out the reaction in a series of at least two reactors arranged in a concurrent cascade system, the total carbonyl compound being added to the first reactor only, and wherein the pH of the reaction is maintained within the range of 12.8 to 13.5.

2. A process according to claim 1 wherein the reaction is carried out in three reactors arranged in a cascade system.

3. A process according to claim 1 wherein the reaction is carried out in four reactors arranged in a cascade system.

4. A process according to claim 1 wherein the chloramine is formed in situ in each reactor by the reaction of gaseous chlorine and aqueous ammonia in the presence of a strong base.

5. A process according to claim 1 wherein the chloramine is formed in a separate step by the reaction of aqueous ammonia and bleach.

6. A process according to claim 1 wherein the chloramine is formed in a separate step from gaseous ammonia and gaseous chlorine.

7. A process according to claim 6 wherein the formation of chloramine takes place at the point of entry to the reactor of the gaseous ammonia and gaseous chlorine.

8. A process according to claim 6 wherein the gaseous ammonia and gaseous chloride are introduced into the reactor through concentric twin nozzles and the chloramine formation takes place at the nozzle.

9. A process according to claim 1 wherein all the aqueous ammonia required is added to the first reactor.

10. A process according to claim 1 wherein only the aqueous ammonia required for chloramine formation (if any) is added to the second and subsequent reactors, and the remainder of the aqueous ammonia required is added to the first reactor.

11. A process according to claim 1 wherein the strong base is an aqueous solution of an alkali metal hydroxide.

12. A process according to claim 1 wherein the carbonyl compound is selected from acetone cyclohexanone and methyl ethyl ketone.

13. A process for the manufacture of azines which comprises reacting aqueous ammonia and a carbonyl compound of the formula:

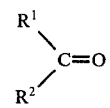

wherein $R^1$ is selected from the group consisting of hydrogen and 1-4 carbon alkyl groups; $R^2$ is selected from the group consisting of 1-4 carbon alkyl groups and phenyl, and $R^1$ and $R^2$ taken together is cyclohexanone, with chloramine in a series of at least two reactors arranged in a concurrent cascade system, the total carbonyl compound reactant being added to the first reactor only wherein a portion of the chloramine used is added to each reactor, wherein the pH of the reaction liquor is maintained between 12.8 and 13.5 by the addition of an aqueous sodium hydroxide solution and wherein at least two moles of the carbonyl compound are used per mole of azine formed.

14. A process according to claim 1 wherein a portion of the reaction product from the final stage of the cascade system is recycled to the first stage.

15. A process according to claim 1 wherein the reaction is carried out at a temperature of from about 25° to 45° C.

16. A process according to claim 1 wherein the reaction is carried out at a temperature of from about 40° to 55° C.

17. A process according to claim 1 wherein less than all of the chloramine used in the process is added to the first reactor.

18. A process according to claim 1 which includes adding chloramine or the reactants to form chloramine in situ to each reactor in the cascade system.

19. In a process for the production of azines which comprises reacting, in the presence of a strong base, chloramine with aqueous ammonia and carbonyl compound of the formula:

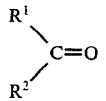

wherein $R^1$ is selected from the group consisting of hydrogen or 1-4 carbon alkyl and $R^2$ is selected from the group consisting of 1-4 carbon alkyl and phenyl, and $R^1$ and $R^2$ taken together is cyclohexanone to provide an azine-containing reaction product, the improvement comprising: carrying out the reaction in a series of two, three or four reactors ranged in a concurrent cascade system, the bulk of the carbonyl compound and the bulk of the aqueous ammonia and less than all of the chloramine added to the first reactor, and wherein chloramine is added or formed in situ in each reactor of the cascade system, and wherein the pH of the reaction is maintained within the range of 12.8 to 13.5.

20. The process according to claim 19 wherein only the aqueous ammonia required for chloramine formation, if any, is added to the second and subsequent reactors, and the remainer of the aqueous ammonia required is added to the first reactor.

21. A process according to claim 19 wherein the total carbonyl compound is added to the first reactor only, and wherein at least two moles of the carbonyl compound are used per mole of azine formed.

22. A process according to claim 19 wherein the carbonyl compound is selected from acetaldehyde, propionaldehyde, methyl isobutyl ketone, diethyl ketone, benzaldehyde, cyclohexanone, acetone or methyl ethyl ketone.

23. A process according to claim 19 wherein the strong base employed is an aqueous solution of potassium hydroxide, sodium hydroxide or calcium hydroxide.

24. A process according to claim 13 wherein the carbonyl compound is acetone, cyclohexanone or methyl ethyl ketone.

25. A process according to claim 13 wherein all of the aqueous ammonia required is added to the first reactor.

26. A process according to claim 13 wherein the reaction is carried out in two, three or four reactors arranged in a cascade system.

27. A process according to claim 13 wherein the reaction is carried out at a temperature of from 25° to 45° C.

* * * * *